US012188236B2

(12) United States Patent
Flann

(10) Patent No.: US 12,188,236 B2
(45) Date of Patent: Jan. 7, 2025

(54) SHADING APPARATUS WITH PANELS

(71) Applicant: SUNCATCHER, LLC, Smithfield, UT (US)

(72) Inventor: Nicholas Flann, Smithfield, UT (US)

(73) Assignee: SUNCATCHER, LLC, Smithfield, UT (US)

( * ) Notice: Subject to any disclaimer, the term of this patent is extended or adjusted under 35 U.S.C. 154(b) by 407 days.

(21) Appl. No.: 17/734,612

(22) Filed: May 2, 2022

(65) Prior Publication Data

US 2022/0356712 A1 Nov. 10, 2022

Related U.S. Application Data

(60) Provisional application No. 63/184,140, filed on May 4, 2021.

(51) Int. Cl.
*E04F 10/10* (2006.01)
*H02S 20/32* (2014.01)

(52) U.S. Cl.
CPC .............. *E04F 10/10* (2013.01); *H02S 20/32* (2014.12)

(58) Field of Classification Search
CPC ............ E04F 10/10; E04F 10/08; H02S 20/32
See application file for complete search history.

(56) References Cited

U.S. PATENT DOCUMENTS 4,649,899 A * 3/1987 Moore .................... F24S 50/20 250/203.4
6,396,239 B1 * 5/2002 Benn ..................... H01M 50/24 320/101
8,119,963 B2 2/2012 Scanlon
9,496,822 B2 * 11/2016 Gerwing ............... F24S 30/458
9,777,483 B2 10/2017 Secco
9,820,540 B2 11/2017 Pan
9,985,154 B2 5/2018 Needham
(Continued)

FOREIGN PATENT DOCUMENTS

CN 209473821 U 10/2019
WO WO2011154108 12/2011
WO WO2022059001 3/2022

OTHER PUBLICATIONS

Megan Barber, High-Tech Umbrella Follows the Sun to Give You Shade, curbed.com, Aug. 22, 2017, pp. 1-2, https://archive.curbed.com/2017/8/22/16184896/shadecraft-sunflower-umbrella-technology, US.

(Continued)

*Primary Examiner* — Beth A Stephan
(74) *Attorney, Agent, or Firm* — Preston P. Frischknecht; Project CIP

(57) ABSTRACT

A shading apparatus with panels configured to provide shade volume over time, reduce wind load, and optionally generate solar energy. The shading apparatus with panels has first panel and second panel arrays. The first panel array moves up and down using a ganging assembly and linear actuator. The second panel array is fixed opposite the first panel array. Both panel arrays are connected to a rotateable spindle and central post. The shading apparatus is configured to reduce wind load with offset panels that provide passages between the offsets. Embodiments include control logic with various modes, including a mode for orienting the panels orthogonal to the sun over a period of time.

16 Claims, 8 Drawing Sheets

100
101
102
103
104
105

(56) References Cited

U.S. PATENT DOCUMENTS

| | | | | |
|---|---|---|---|---|
| 10,511,250 | B2 | 12/2019 | Wylie | |
| 10,772,401 | B2 | 9/2020 | Akin | |
| 2008/0196758 | A1* | 8/2008 | McGuire | H02S 10/40 290/55 |
| 2008/0308091 | A1* | 12/2008 | Corio | F24S 30/425 126/606 |
| 2009/0032089 | A1* | 2/2009 | Chen | H02S 20/24 136/246 |
| 2010/0101559 | A1* | 4/2010 | Grant | H02S 20/10 126/600 |
| 2010/0175741 | A1* | 7/2010 | Thorne | H02S 20/32 136/251 |
| 2013/0192659 | A1* | 8/2013 | Upton | H01L 31/052 136/246 |
| 2017/0025989 | A1* | 1/2017 | Shaw | F24S 30/428 |
| 2021/0194417 | A1* | 6/2021 | Sharpe | G05D 3/105 |
| 2021/0251156 | A1 | 8/2021 | Davico | |

OTHER PUBLICATIONS

N/A, A Skin of Movable Solar Panels Helps Buildings Keep Their Cool, Nature, Jul. 8, 2019, pp. 1-2, https://www.nature.com/articles/d41586-019-02105-6, US.

N/A, Two-Axis Tracking, PVPerformance, Apr. 11, 2022, p. 1, https://pvpmc.sandia.gov/modeling-steps/1-weather-design-inputs/array-orientation/two-axis-tracking/, US.

* cited by examiner

SHADING APPARATUS WITH PANELS

RELATED APPLICATIONS

This application is the non-provisional version of, and claims priority to, U.S. Provisional Patent Application No. 63/184,140, filed on May 4, 2021.

BACKGROUND OF THE INVENTION

Millions of acres of outdoor space are poorly utilized because they cannot be comfortably or beneficially put to use. Shade makes space useful. In this age of heat domes, record temperatures, and remote work, the need for shade has never been greater. Yet, current shade devices have many disadvantages. For example, current shade devices typically give only partial shade, particularly as the sun moves across the sky over a period of time. While many shade devices have means for adjusting and/or repositioning as the sun moves, this process is cumbersome and repetitive. Furthermore, most devices incorporate traditional umbrella-style configurations with sail-like canopies that are highly susceptible to wind load in outdoor spaces. Such designs are dangerous because they may lead to property damage or even personal injury in high wind situations.

Separately, environmental concerns and technological and material advances have increased the awareness in the fields of personal energy production and self-reliance. In particular, people increasingly incorporate solar panels on their residences and use solar energy in other applications. Where shade devices are deployed, there is also an opportunity for solar energy production. While some solar energy producing shade devices exist in the prior art, these devices still share many of the above-mentioned disadvantages of traditional designs, including partial shading problems and wind-load susceptibility.

In light of the above, a new shading device is needed to solve the problems of providing full shade over time, reducing wind load, and maintaining an option for personal solar energy production.

SUMMARY OF THE INVENTION

In accordance with the above, a new and innovative shading apparatus with panels is provided. The problems of providing shade over time, reducing wind load, and maintaining an option for personal solar energy production in a shading device are solved. Embodiments of the present invention include a shading apparatus with panels comprising: a first panel array comprised of a plurality of panels, the first panel array configured to move within a longitudinal plane; and a second panel array opposite the first panel array comprised of one or more panels fixed in a generally horizontal position; the first and second panel arrays further configured to rotate about a longitudinal axis and provide a shade volume to an area underneath the shading apparatus with panels.

These and other aspects of the present invention will become more fully apparent from the following description and appended claim, or may be learned by the practice of the invention as set forth hereinafter.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

The present invention in its various embodiments, some of which are depicted in the figures herein, is a shading apparatus with panels.

Figure 1:
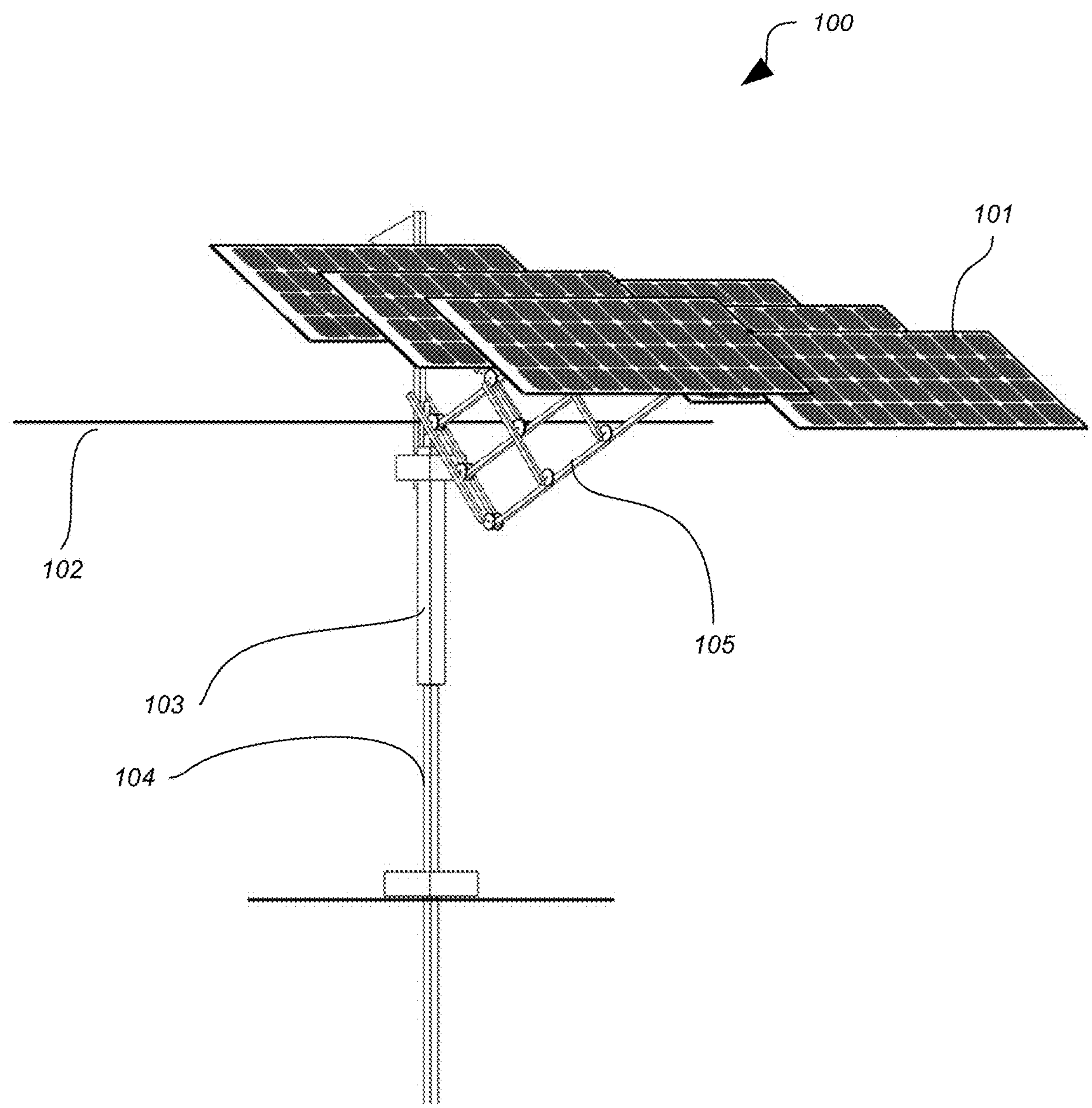
FIG. 1 is front perspective view of one embodiment of a shading apparatus with panels.
Figure 2:
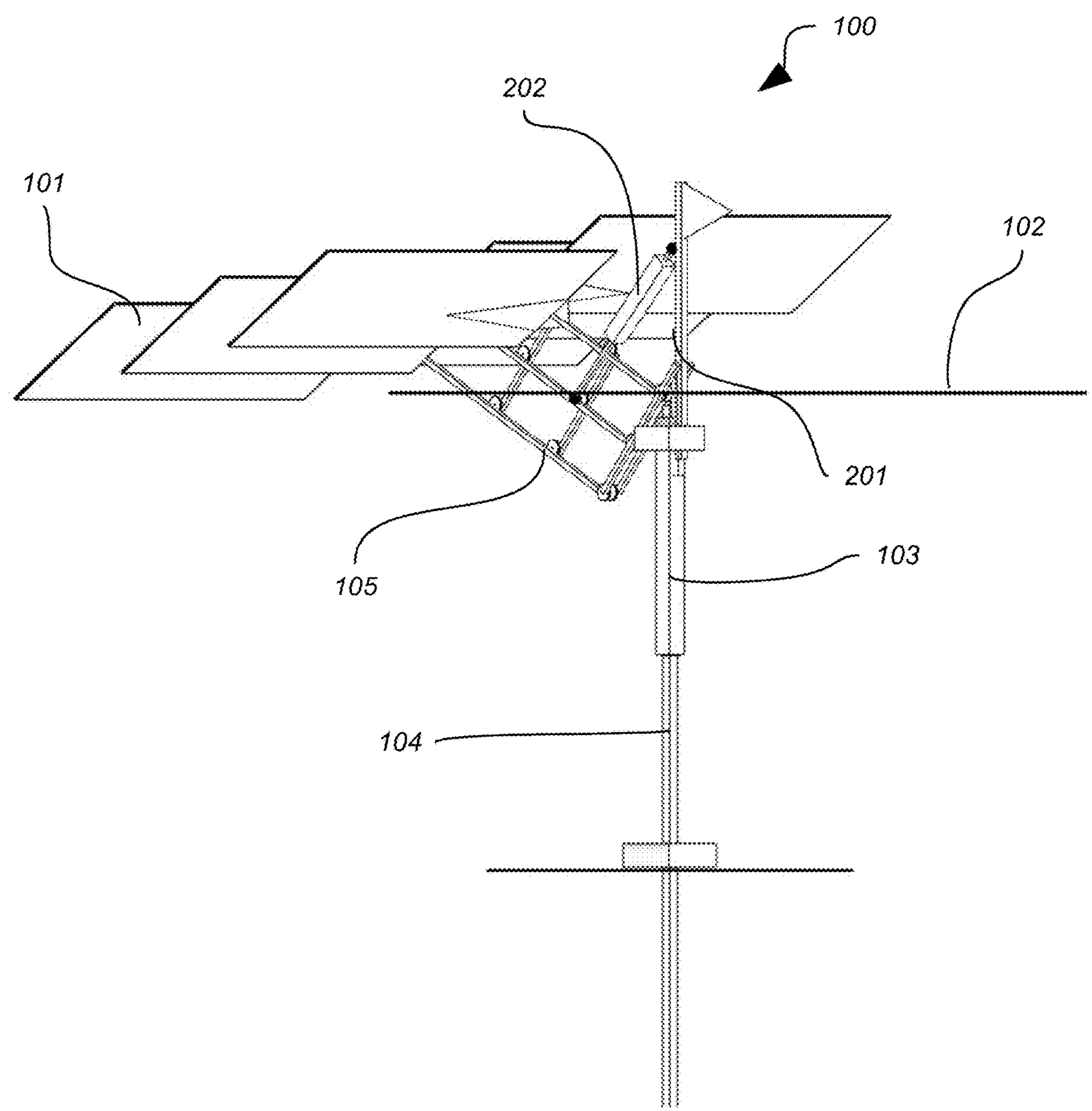
FIG. 2 is a back perspective view of one embodiment of a shading apparatus with panels.

Referring now to FIGS. 1-2, one embodiment of a shading apparatus with panels 100 is shown. In the illustrated embodiment, the shading apparatus with panels 100 is comprised of opposing first 101 and second 102 panel arrays connected to a rotatable spindle assembly 103, which in turn, is connected to a central post 104. In the illustrated embodiment, panels are solar for generating electricity. However, any generally planar surface may be used as a panel without departing from the purposes and scope of the invention. The first panel array 101 is attached to the spindle assembly 103 (in the illustrated embodiment, the spindle extension 201 portion of the spindle assembly) by means of a ganging assembly 105 configured to raise and/or lower the first panel array. The second panel array 102 is horizontally oriented and fixed to the spindle assembly 103 on a side opposite the first panel array 101. A linear actuator 202 may be connected to the ganging assembly 105 generally between the central post 104 and/or spindle assembly 103 and the first panel array 101.

Figure 3:
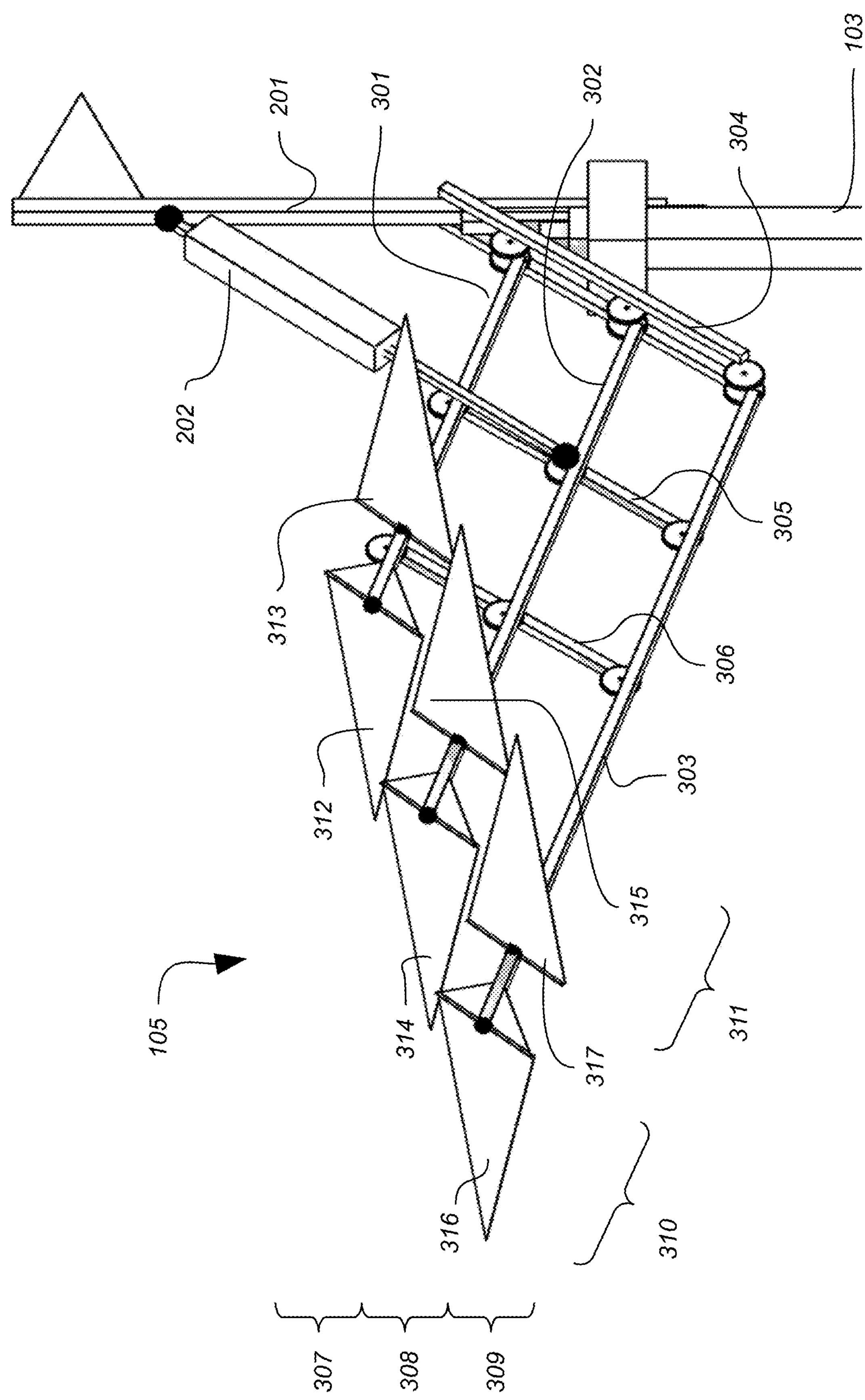
FIG. 3 is a perspective view of a ganging assembly in one embodiment of a shading apparatus with panels.

Referring now to FIG. 3, the ganging assembly 105 and adjacent components are described in more detail. Ganging assembly 105 is comprised of panel arms (e.g., 301-303) that extend away from the central post 104 and/or spindle assembly 103. In the illustrated embodiment, ganging assembly 105 has first 301, second 302, and third 303 panel arms. Bracing arms (e.g., 304-306) are located between and pivotally attached to panel arms. In the embodiment shown, ganging assembly 105 has first 304, second 305, and third 306 bracing arms. Mated vertical disks at pivot points improve stiffness in the ganging assembly. At a first end, linear actuator 202 may attach to the ganging assembly 105, and, at a second end, to the spindle assembly 103. Linear actuator 202 is configured to move the ganging assembly 105 upward and/or downward within a longitudinal plane.

Panels, solar or otherwise, may be attached adjacent to panel arm first ends. Panel arms 301-303 have different lengths to generally arrange attached panels in panel depth tiers. For example, the illustrated embodiment has first 307, second 308, and third 309 such panel depth tiers. Panels may also be further arranged into panel depth sub-tiers by off-setting panel mounting locations (e.g., 312-317) on each panel arm. For example, the offset of panel mounting locations 312 and 313 results in an offset or panel depth sub-tiers 310, 311 for attached panels. In operation, and as assembled, a panel mounted on the left panel mounting location 312 would be forward of a panel mounted on the right panel mounting location 313.

Figure 4:
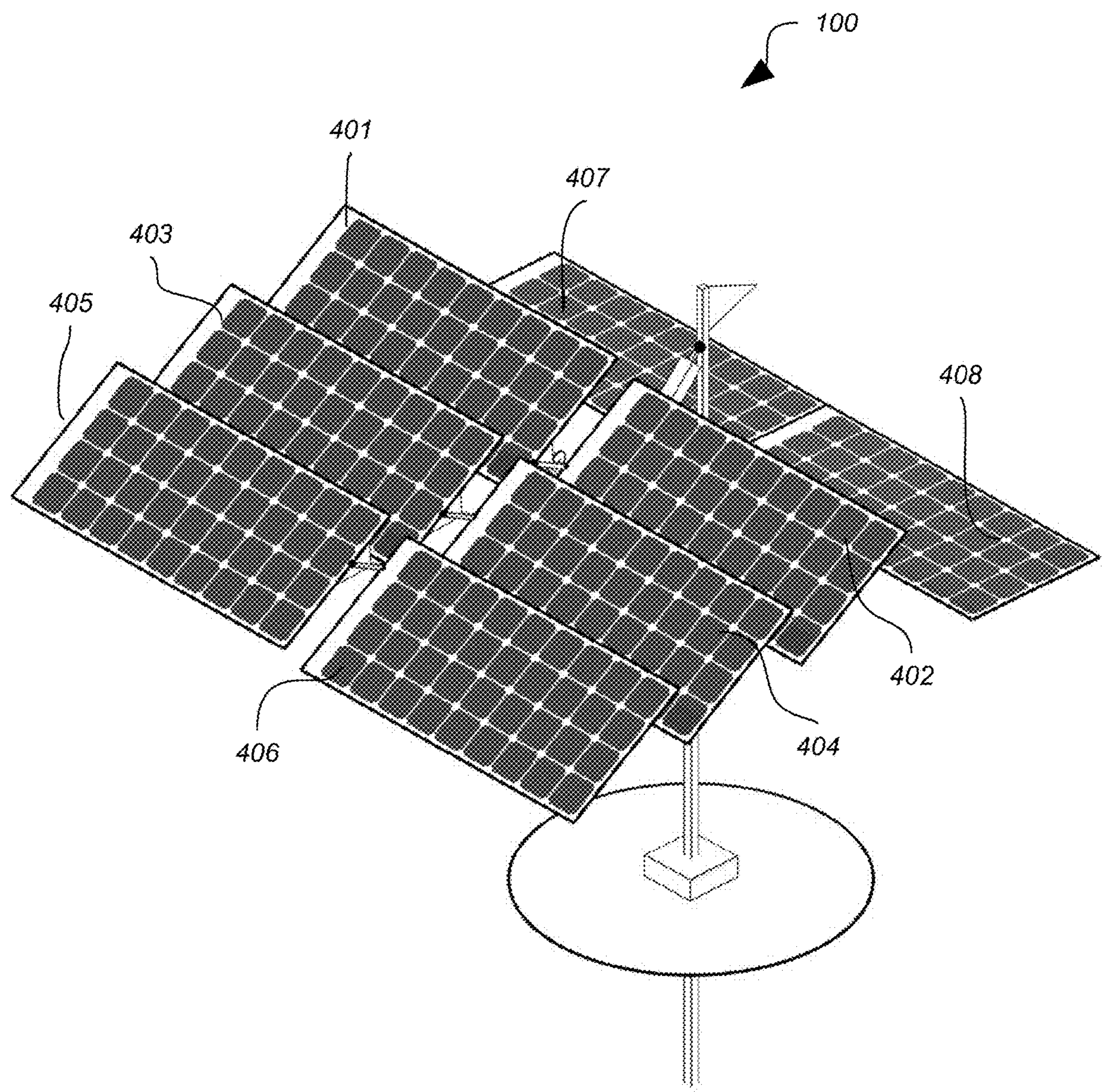
FIG. 4 is a top perspective view of one embodiment of a shading apparatus with panels.
Figure 5:
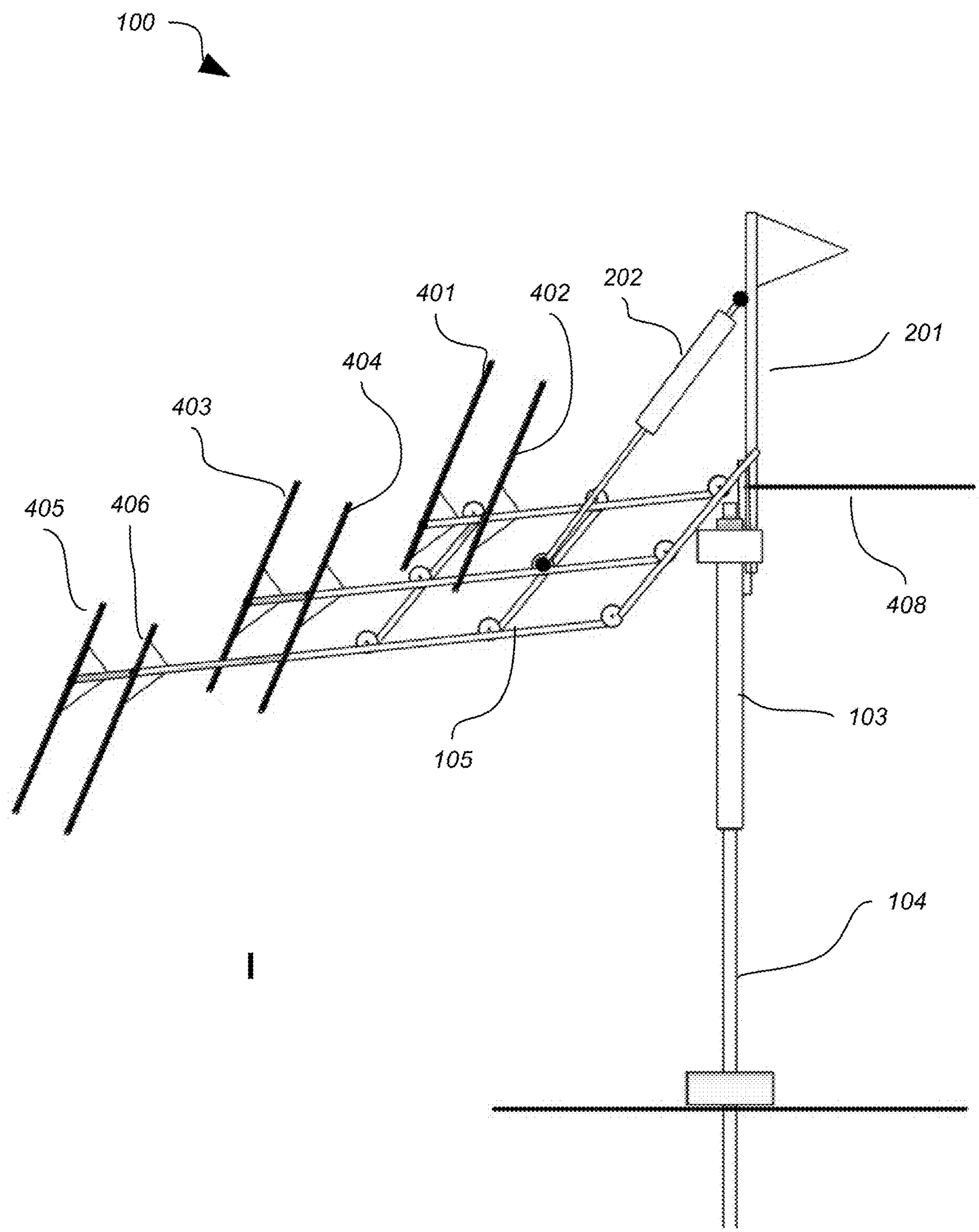
FIG. 5 is a side view of one embodiment of a shading apparatus with panels in a first position.
Figure 6:
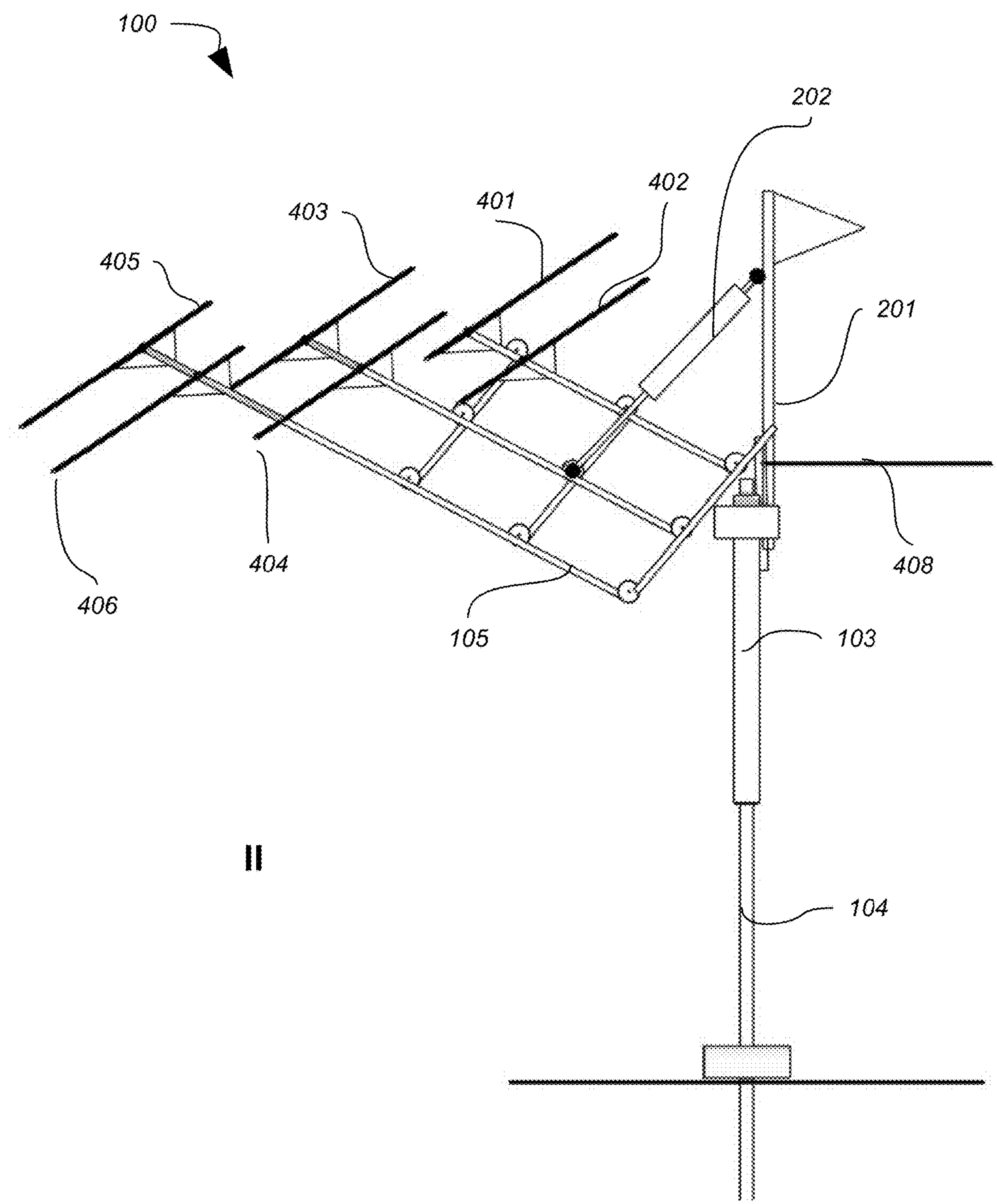
FIG. 6 is a side view of one embodiment of a shading apparatus with panels in a second position.

Referring now to FIG. 4, a shading apparatus with panels 100 is shown having a first panel array with a plurality of solar panels including first 401, second 402, third 403, fourth 404, fifth 405, and sixth 406 panels, and a second panel array with seventh 407 and eighth 408 panels. Other embodiments may incorporate different numbers of panels. By adopting a multiple, off-set panel configuration, the shading apparatus with panels minimizes wind load, particularly in comparison to other shading designs and configurations. Moreover, the spatial arrangement of the panels minimizes intra-panel shading and/or overlap while maximizing shade volume given fixed and/or standard sized panels.

Referring now to FIGS. 5-8, examples of the positionable functionality of the illustrated embodiment are shown. In general, the first array may be raised or lowered by the linear actuator. In a first position I, the linear actuator 202, ganging assembly 105, and first panel array are fully extended. The panels of the first panel array 401-406 are approximately 23 degrees above the horizon and generally orthogonal to a point corresponding to a low horizon sun position. In a second and intermediate position II, the linear actuator 202, ganging assembly 105, and first panel array are shown somewhat raised. The panels of the first panel array 401-406 are approximately 56.5 degrees above the horizon and generally orthogonal to a point corresponding to a high horizon sun position. In a third position III, the linear actuator 202, ganging assembly 105, and first panel array are shown fully raised and/or retracted, with the panels of the first panel array 401-406 approximately horizontal, 90 degrees above the horizon, and/or generally orthogonal to a point corresponding to a highest sun position. In this third position III, the shading apparatus with panels is also optimized for minimizing crosswind resistance, in part, through its minimal cross section structure. Other embodiments may incorporate other positionable functionality and/or configuration. For example, in some embodiments, the panels of the first panel array 401-406 may be configured to collect and/or channel precipitation.

Figure 8:
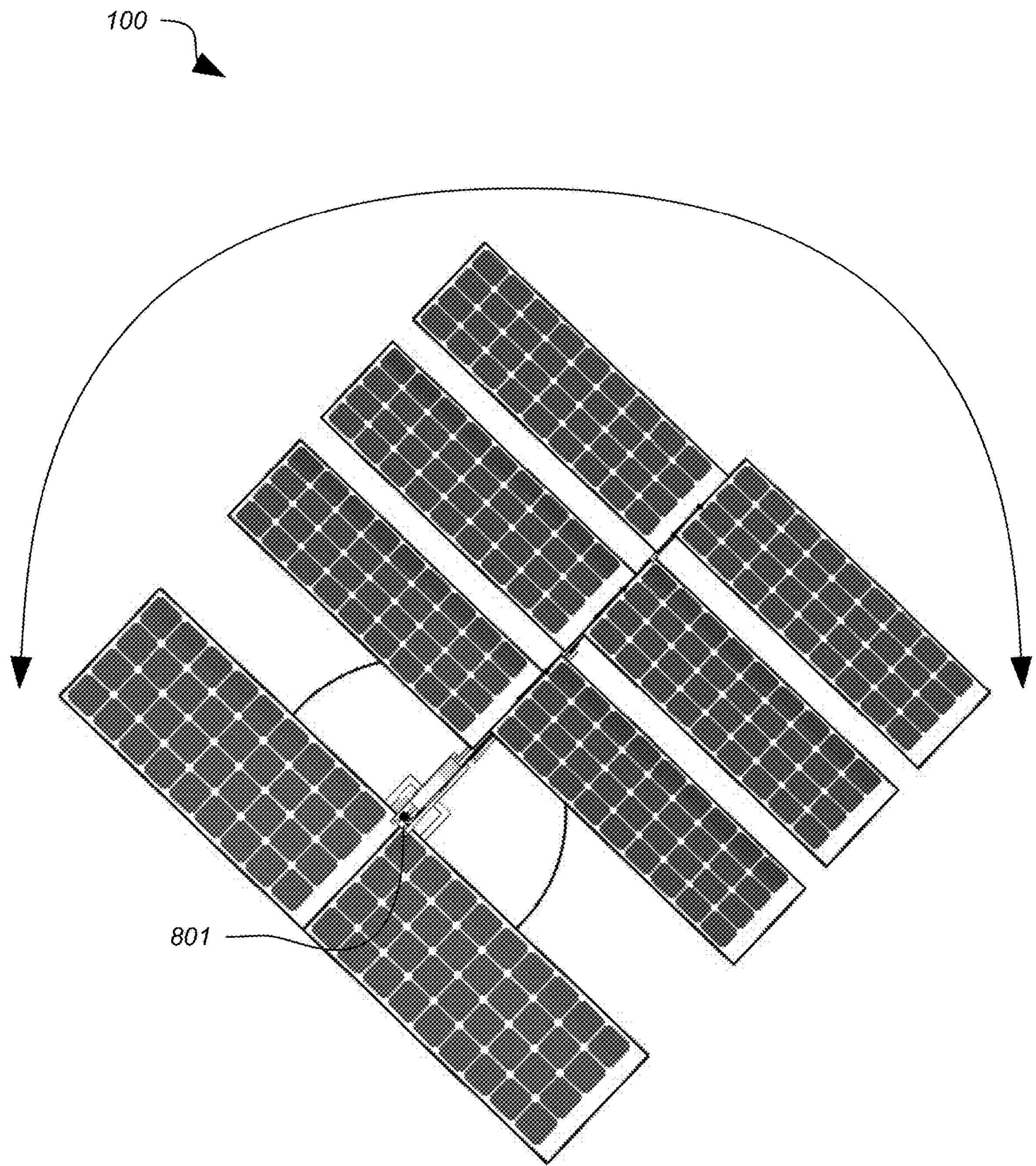
FIG. 8 is top view of one embodiment of a shading apparatus with panels.

Referring now to FIG. 8, the first and second panel arrays are fully rotatable about a longitudinal axis 801 generally corresponding to the central post 104. Thus configured, the shading apparatus with panels may be generally positioned towards any desired azimuth and/or elevation. Additional positioning means vary across embodiments. For example, in one version, the shading apparatus with panels may be azimuth-positioned manually, for example, by a user hand-rotating the spindle assembly, including by using a handle or similar means (not shown) located adjacent the spindle assembly. Such a version may also be elevation-positioned via the linear actuator through direct and/or remote control, with corresponding user interfaces for accomplishing the same.

In another version, the shading apparatus with panels may incorporate electromagnetic actuators, which, together with the linear actuator, utilize control logic with one or more of: direct and/or remote motor control, an onboard computer with software; onboard hardware with firmware; downloadable computer application software for mobile devices and the like; and/or temporary online non-downloadable software, with corresponding user interfaces. Software and/or firmware may have instructions for moving and/or positioning the shading apparatus with panels according to various modes. Such modes may include: a first mode wherein a user may orient the first panel array towards a desired altitude angle; a second mode wherein a user may orient the first panel array towards a desired azimuth; a third mode wherein the first panel array orients orthogonal to the sun over a period of time; a fourth mode wherein the first panel array moves to a position whereby each panel of the plurality of panels is generally horizontal and/or optimized to reduce wind load; a fifth mode wherein the first panel array is configured to collect and/or channel rainwater; and a sixth mode wherein the first panel array is configured to move away from an assigned location.

Examples of the functionality imparted to the above-described structure by software instructions are further provided. For example, in the third mode, software instructions in combination with the structure create continuous shade all day as a volume underneath the shading apparatus with panels by positionally adjusting the panel arrays as the sun moves across the sky. Each panel may be configured orthogonally to the sun's current position by rotating the ganging assembly 105 in azimuth and in altitude through actuation of linear motor 202. Automatic control may be achieved by software actively tracking the position of the sun based on the local time and latitude and longitude of the deployed location. At time intervals during the day, an automatic controller may wake up and actuate the motors to reconfigure the shading apparatus with panels to minimize a misalignment caused by the Earth's rotation since the previous adjustment.

Figure 7:
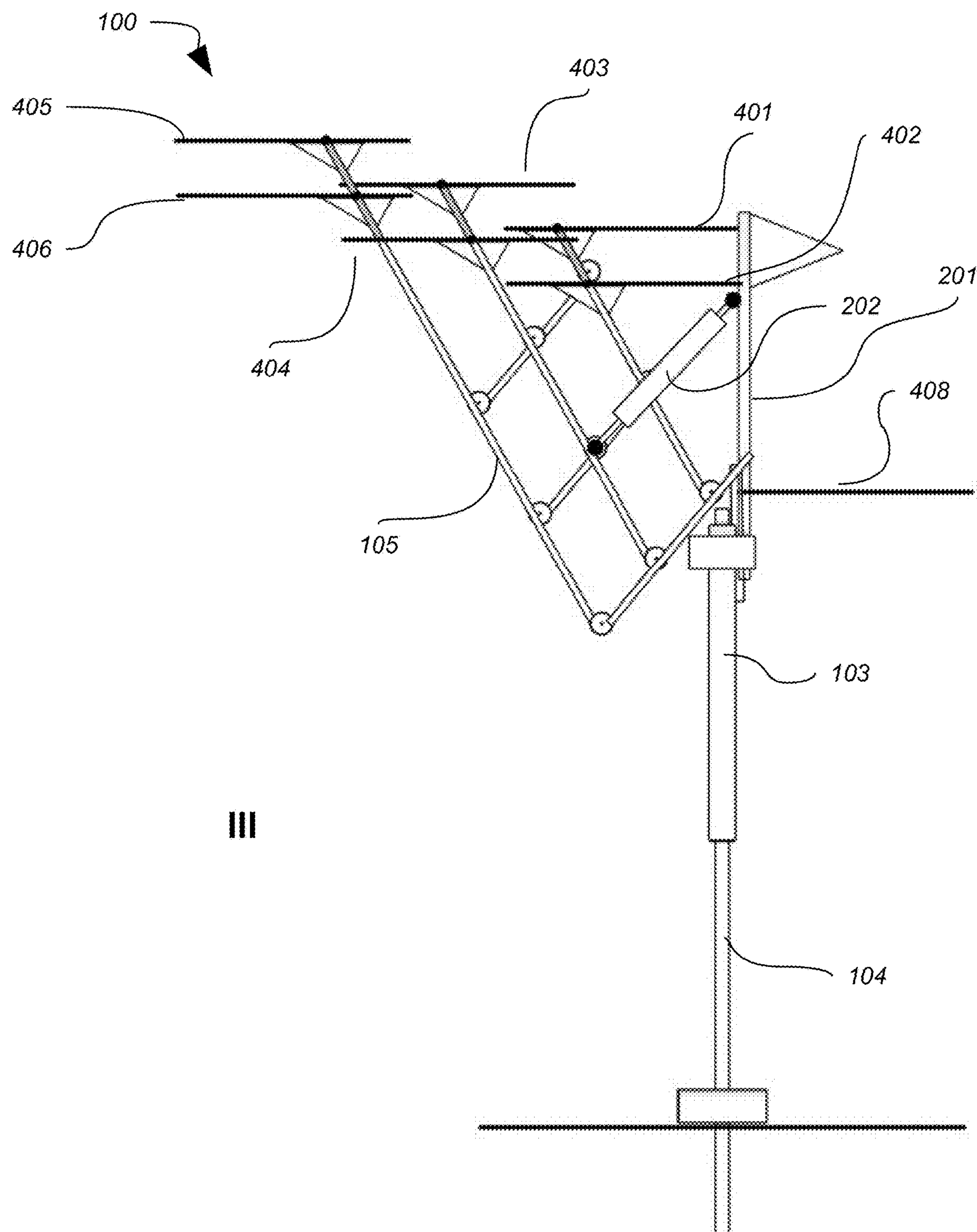
FIG. 7 is a side view of one embodiment of a shading apparatus with panels in a third position.

In another example, in the fourth mode, software instructions in combination with the structure place the apparatus in a wind-safe configuration with each panel exactly horizontal, minimizing resistance to winds running parallel to the ground. Software instructs linear motor 202 to fully retract, pulling arms 301, 302, and 303 up until panels 401-406 are exactly horizontal, as depicted in FIG. 7. There may be no need to adjust the AZ configuration because minimal area is presented independent of wind direction. This mode may be entered automatically by software reacting to local wind speed measurements obtained through sensors or through weather reports/forecasts read from the internet.

In another example, the appropriate azimuth and altitude to operate in the fifth mode depend upon the integration of water collection and containment apparatus onto the panels and spindle. In one embodiment, panels may be configured to be held horizontal as in the fourth mode, yet offer a slight gradient to water collecting on their surface to collect towards the panel mounting locations (for example 312 and 313) towards the central post 104 which may include guttering and water storage below. This mode may be entered automatically by software reacting to local precipitation measurements obtained through sensors or through weather reports/forecasts read from the internet.

In another example, the sixth mode where the panels are lifted up and away from the central post and shade volume is important to allow free access to the space if needed, such as in agribusiness. Software may control this automatically through proximity sensors or direct commands from a user interface.

Embodiments of the shading apparatus with panels may include other features and/or configurations. For example, the shading apparatus with panels may be configured as a patio accessory (with a table, etc). In another example, the shading apparatus with panels may be configured as a guzzler, trough, or other water supply. In yet another example, the shading apparatus with panels may be configured for animal and/or pet shading. In various embodiments, the shading apparatus may be configured as a disassembled kit and/or parts easily fitted into a box and/or shipping container for transport. Consequently, various methods of assembly and/or installation are contemplated. Shading apparatus with panels may include a battery for collecting energy from solar panels, a power supply, controls, and/or user interface.

So configured, the shading apparatus with panels solves the problems of providing shade over time, reducing wind load, and maintaining an option for personal solar energy production in a shading device.

The present invention may be embodied in other specific forms without departing from its spirit or essential characteristics. For example, the illustrated embodiments generally show one embodiment of the invention with a six-panel first array and two panel second array. However, any number of panels (fewer or more) may be used in the invention. In another example, the illustrated embodiments show panel positions at specific degrees above the horizon. However, embodiments may vary in their degrees and/or degree ranges from those specified. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A shading apparatus comprising:

a first panel array comprised of a plurality of panels, the first panel array configured to move within a longitudinal plane; and a second panel array opposite the first panel array comprised of one or more panels fixed in a generally horizontal position;

the first and second panel arrays configured to rotate about a longitudinal axis and provide a shade volume to an area underneath the shading apparatus.

2. The shading apparatus of claim 1, wherein the first and second panel arrays are substantially comprised of solar panels.

3. The shading apparatus of claim 1, the first panel array configured to move to a position whereby each panel of the plurality of panels is generally horizontal.

4. The shading apparatus of claim 1, further comprising a central post connected to and between the first and second panel arrays.

5. The shading apparatus of claim 4, further comprising a ganging assembly connected to and between the first panel array and the central post.

6. The shading apparatus of claim 5, the ganging assembly further having two or more arm members that are pivotable in the same plane.

7. The shading apparatus of claim 6, each panel of the first panel array connected to the ganging assembly adjacent an end of one of the arm members.

8. The shading apparatus of claim 5, further comprising a linear actuator connected to the ganging assembly generally between the central post and the first panel array and configured to move the ganging assembly.

9. The shading apparatus of claim 1, further comprising a control unit having control modes configured to operate the shading apparatus in one or more of the following modes:

a first mode wherein a user may orient the first panel array towards a desired altitude angle;

a second mode wherein a user may orient the first panel array towards a desired azimuth;

a third mode wherein the first panel array orients orthogonal to the sun over a period of time;

a fourth mode wherein the first panel array moves to a position whereby each panel of the plurality of panels is generally horizontal;

a fifth mode wherein the first panel array is configured to collect rainwater;

a sixth mode wherein the first panel array is configured to move away from an assigned location.

10. A shading apparatus comprising:

one or more panel arrays comprised of a plurality of panels comprising a first panel array configured to move within a longitudinal plane;

a second panel array opposite the first panel array fixed in a generally horizontal position;

a central post between the first and second panel arrays;

a ganging assembly between the first panel array and the central post having two or more arm members that are pivotable in the same plane;

wherein a majority of the panels within the plurality of panels configured to reduce wind load by being offset from each other and by providing passages between the offsets.

11. The shading apparatus of claim 10, the first panel array configured to move to a position whereby the panels within the array are generally horizontal.

12. The shading apparatus of claim 10, further comprising a linear actuator connected to the ganging assembly generally between the central post and the first panel array and configured to move the ganging assembly.

13. The shading apparatus of claim 12, further comprising a control unit having control modes configured to operate the shading apparatus with panels in one or more of the following modes:

a first mode wherein a user may orient the first panel array towards a desired altitude angle;

a second mode wherein a user may orient the first panel array towards a desired azimuth;

a third mode wherein the first panel array orients orthogonal to the sun over a period of time;

a fourth mode wherein the first panel array moves to a position whereby each panel of the plurality of panels is generally horizontal;

a fifth mode wherein the first panel array is configured to collect rainwater;

a sixth mode wherein the first panel array is configured to move away from an assigned location.

14. A shading apparatus comprising:

a central post;

a rotatable spindle assembly connected to the central post;

a ganging assembly connected to the rotatable spindle, the ganging assembly having two or more arm members that are pivotable in the same plane;

a first panel array comprised of panels, each panel of the first panel array attached to the ganging assembly adjacent an end of one of the arm members; and a linear actuator connected to the ganging assembly generally between the rotatable spindle and the first panel array and configured to move the two or more arm members up and down;

the shading apparatus configured to provide shade from the sun to a volume of space beneath a canopy formed by the shading apparatus when in operation.

15. The shading apparatus of claim 14, further comprising a second panel array comprised of panels opposite the first panel array, the second panel array panels connected to the rotatable spindle and fixed in a generally horizontal position.

16. The shading apparatus of claim 15, wherein the first and second panel arrays are substantially comprised of solar panels.

* * * * *